April 18, 1967  O. R. POTTER ETAL  3,314,378
DRIVE DISENGAGING TROLLEY SYSTEM
Filed July 2, 1962  3 Sheets-Sheet 1

INVENTORS
ALGE T. PETERSON JR. &
BY OMER R. POTTER

Fishburn & Gold
ATTORNEYS

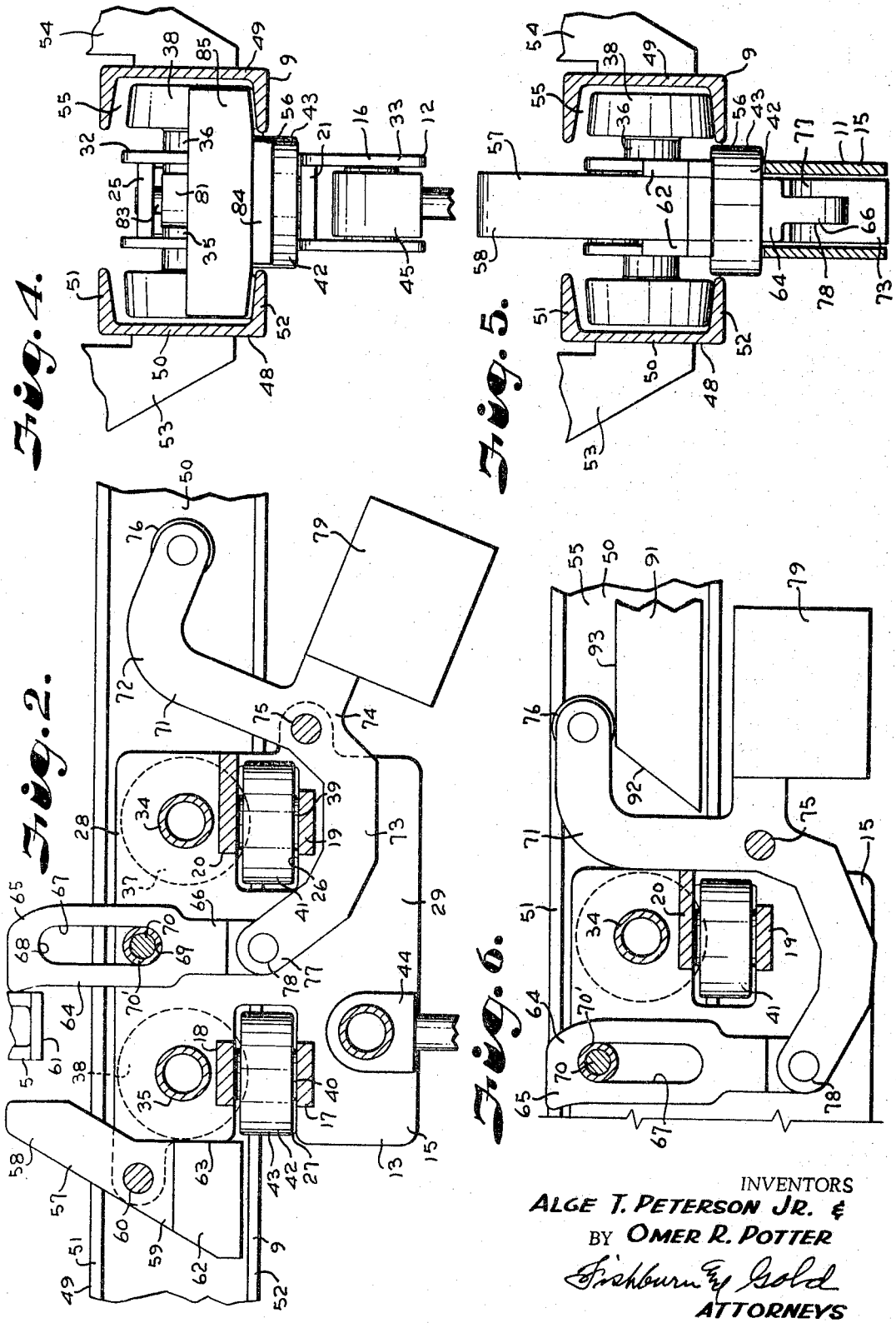

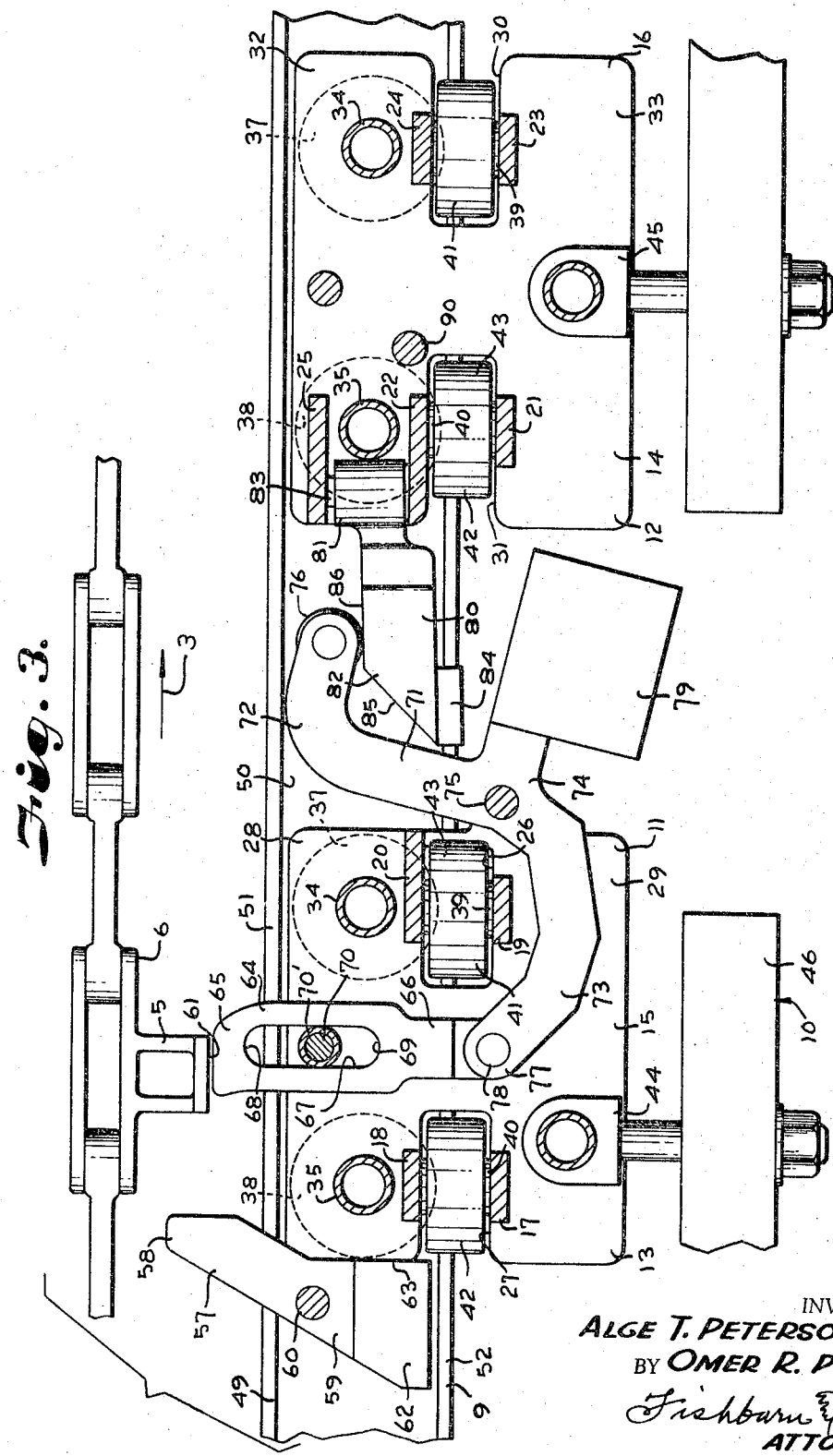

United States Patent Office 3,314,378
Patented Apr. 18, 1967

3,314,378
DRIVE DISENGAGING TROLLEY SYSTEM
Omer R. Potter, Kansas City, Kans., and Alge T. Peterson, Jr., Kansas City, Mo., assignors to Midwest Conveyor Company, Inc., Kansas City, Kans., a corporation of Kansas
Filed July 2, 1962, Ser. No. 206,890
3 Claims. (Cl. 104—96)

This invention relates to conveyor systems, and more particularly to power and free conveyor systems having drive disengaging trolleys.

In power and free conveyor systems load-carrying trolley assemblies are propelled along load tracks by means of pusher lugs associated with an endless driven chain supported by chain trolleys running along a track spaced adjacent the load tracks. The chain pusher lugs normally disengage from the load-carrying trolleys when such trolleys are switched to a side track, thus freeing the load from the main track line for any suitable purpose, such as painting or assembling parts thereto. Upon propelling the side-tracked load-carrying trolleys back onto the main track through a switch, the chain pusher lugs normally again contact same for urging the load-carrying trolleys along the main track.

It is often desirable to stop a load-carrying trolley assembly while the trolleys thereof are moving along the main track and without switching to a side track. One method of doing this is by stopping the chain; however, this is obviously to be avoided, if possible, since the entire line would be shut down. If means are used to disengage a single trolley from the driving chain while the trolley is located on the main track, provision must be made to disengage succeeding trolleys as they approach the first disengaged trolley or the first disengaged trolley will simply be propelled along with the succeeding trolley in a cluster. Heretofore, devices have been developed for use in connection with trolleys and drive chains for disengaging trolleys while on the main track and making provision for disengaging succeeding trolleys as they approach the first disengaged trolleys; however, such devices have been highly complex, often unreliable and generally unsuitable for high load or elongated load systems. The problems in disengaging trolleys on the main track are compounded in conveyor systems adapted for elongated loads which require spaced front and rear hangers and, consequently, spaced front and rear trolleys interconnected to form trolley assemblies.

The principal objects of the present invention are: to provide improved and simplified mechanisms for disengaging load-carrying trolley assemblies from chain-driven pusher lugs; to provide such mechanisms whereby a trolley is disengaged either by a stationary control member or by contact between succeeding trolleys; to provide a disengaging trolley system which requires a minimum of head space between the load and the driving chain for containing the trolley and chain engaging mechanism; to provide a disengaging conveyor trolley system so constructed as to have major portions thereof housed between elongated channels forming the load tracks; to provide such a device which permits track curves to be easily negotiated without binding; to provide a linkage arrangement in a disengaging trolley system whereby torque, lever action and horizontal thrust are combined to provide a force for disengaging the trolley; to provide a deactuating trolley mechanism that provides for over-travel which further urges the chain-engaging dogs into disengaging position; to provide such a conveyor system wherein the trolleys are caged between inwardly opening channels to prevent undue trolley rotation or track disengagement in the event of high contacting forces with succeeding trolleys; to provide a drive-disengaging trolley system well adapted for elongated loads requiring a plurality of spaced hangers such as front and rear hangers; and to provide a power and free conveyor system which is simple in construction and yet well adapted for rugged service.

Other objects and advantages of this invention will become apparent from the following description taken in connection with the accompanying drawings wherein are set forth by way of illustration and example certain embodiments of this invention.

FIG. 2 is a fragmentary view in side elevation on a larger scale showing details of a front trolley.

FIG. 3 is a fragmentary view in side elevation on a larger scale showing a front trolley engaging a rear trolley of a preceding trolley assembly.

FIG. 4 is a fragmentary cross-sectional view taken on the line 4—4, FIG. 1, on a larger scale, particularly showing the track-forming channels and a cam surface forming trailing member on a rear trolley.

FIG. 5 is a fragmentary cross-sectional view taken on the line 5—5, FIG. 1, showing on a larger scale details of a front trolley.

FIG. 6 is a fragmentary view in side elevation on a larger scale showing a front trolley drive dog disengaging linkage engaged with a cam member for full drive dog withdrawal.

Figure 1:
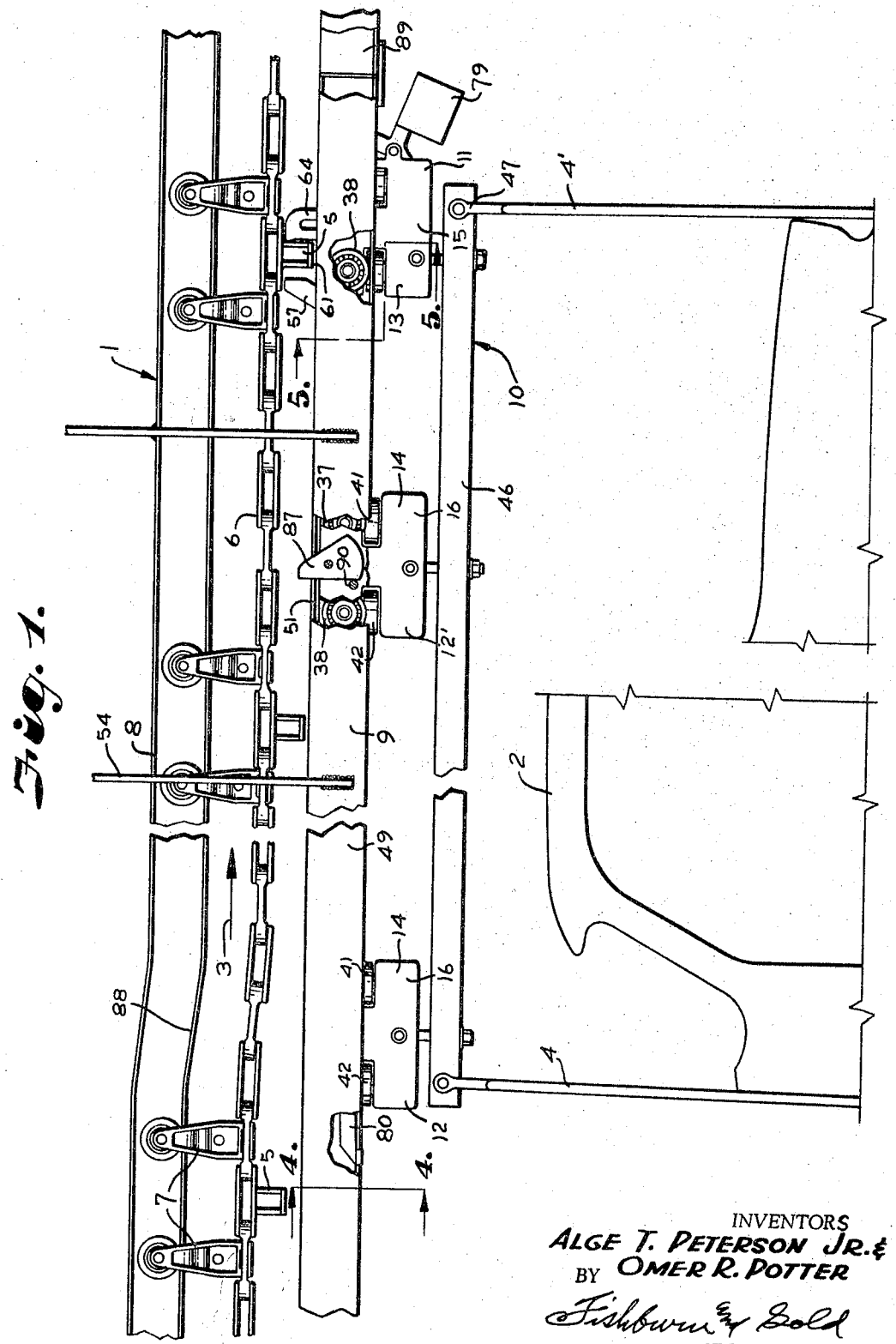
FIG. 1 is a fragmentary side elevational view of a trolley assembly in a power and free conveyor system embodying this invention.

Referring to the drawings in more detail:

The reference numeral 1 generally indicates a power and free conveyor system adapted to convey elongated loads. In the illustrated example, the load comprises an automobile body 2 being transported in the direction indicated by the arrow 3. Such elongated loads require a front hanger 4 and a rear hanger 4' spaced apart a distance substantially equal to the overall length of the load. The automobile body 2, in the illustrated example, is propelled by means of pusher lugs 5 depending from an endless driven chain 6 suspended from chain trolleys 7 running along a chain supporting track 8.

In the illustrated example, the automobile body 2 is propelled along load tracks broadly designated 9 which are spaced beneath the chain-supporting track 8 and are described more fully hereinafter.

The car body 2 is movably supported with respect to the load tracks 9 by means of a load-carrying trolley assembly broadly designated 10 and having a plurality of trolleys, as for example, a front trolley 11 and a rear trolley 12 and one or more intermediate trolleys 12'. The load may be supported by any desired combination of the trolleys 11, 12 and 12', the assembly and connections being variable to accommodate the loads and conditions. Each of the trolleys 11 and 12 are comprised of a frame 13 and 14 respectively which frames include pairs of laterally spaced vertically extending parallel plate members 15 and 16 respectively. The frames 14 of the trolleys 12' are preferably substantially the same as the frame of the rear trolley 12. Transverse connecting bars 17, 18, 19 and 20 extend between and are secured to the front trolley plate members 15 and rigidly maintain said plates in spaced relation. Transverse bars 21, 22, 23 and 24 are similar to and perform the same function with respect to the plate members 16 of the trolleys 12 and 12'. An additional transverse bar 25 extends between the plate members 16 of the rear trolley 12 for a purpose described hereinafter.

The plate members 15 on the front trolley 11 have front and rear aligned horizontal slots 26 and 27 respectively extending laterally through the plate members on each side of the front trolley 11 and dividing same into an upper portion 28 and a lower portion 29. Similarly, the rear trolley 12 has front and rear horizontal slots 30 and 31 respectively, dividing the rear trolley 12 into upper and lower portions 32 and 33.

Each of the trolleys 11, 12 and 12' has spaced front and rear horizontal axles designated 34 and 35 having opposite ends 36 projecting laterally outwardly of the respective plate members on the trolley upper portions 28 and 32. A pair of front wheels 37 and a pair of rear wheels 38 are included on each of the trolleys 11, 12 and 12' and are respectively mounted on the opposite ends 36 of the front and rear axles 34 and 35.

Spaced front and rear vertical axles 39 and 40 are respectively mounted between the transverse bars 17, 18, 19 and 20 of the front trolley 11 and the transverse bars 21, 22, 23 and 24 of the rear trolley 12 and intermediate trolley 12'. The front vertical axles 39 respectively extend across the front slots 26 and 30 and the rear vertical axles 40 respectively extend across the rear slots 27 and 31 of each of the trolleys. A front guide wheel 41 and a rear guide wheel 42 are respectively mounted on the front and rear vertical axles 39 and 40 and have peripheries 43 which project laterally outwardly of the respective plate members 15 and 16 through the respective front and rear slots 26, 27, 30 and 31.

Depending load supports 44 and 45 are respectively secured to and between the pairs of plate members 15 and 16 on each of the trolley lower portions 29 and 33 of load-carrying trolleys. An elongated beam 46 is connected to and extends between the depending load supports 44 and 45, insuring the desired separation of the trolleys 11 and 12 along the load tracks 9. The hangers 4 and 4' are secured, in the illustrated example, by means of suitable pin and clevis devices 47 to opposite ends of the beam 46 adjacent the respective depending load supports 44 and 45; however, it is to be understood that other arrangements for securing the hangers to the trolleys may be used without departing from this invention.

A pair of elongated laterally spaced channels 48 and 49 each have a vertically disposed web 50 and upper and lower flanges 51 and 52 respectively. The channels 48 and 49 and the chain track 8 are suitably supported by structural members 53 and 54 which are located in suitably spaced relation therealong. The channels 48 and 49 open toward each other forming an elongated partial enclosure 55 therebetween which contains the trolley upper portions 28 and 32 and the structure associated therewith including the load wheels 37 and 38. The lower flanges 52 are horizontally aligned with respect to each other and form the load tracks noted above for the respective load wheels 37 and 38. The lower flanges 52 also form facing oppositely disposed guiding surfaces 56 spaced slightly outwardly from the peripheries 43 of the guide wheels 41 and 42 for maintaining the trolleys 11 and 12 properly located within the partial enclosure 55 during travel along the load tracks.

The front trolley upper portion 28 includes an elongated rear latch dog 57 having an upper part 58 and a lower part 59. The latch dog lower part 59 is pivotally mounted at 60 to and between the front trolley plate members 15 for pivotal movement of the latch dog upper part 58 forwardly of the trolley. The lower part 59 of the latch dog 57 is greater in weight than the upper part 58 causing the latch dog to be counterweighted for maintaining the upper part 58 in a normally upright position extending above the channel upper flanges 51. The latch dog upper part 58 normally terminates at an elevation above the lower end 61 of the chain pusher lugs 5 to provide interference with the path of travel thereof for a reason described hereinafter. The latch dog lower part 59 includes laterally extending portions 62 adapted to abut the end edge 63 of the plate members 15 when the latch dog upper part 58 is in said normally upright position. It is to be understood that the relationship between the laterally extending portion 62 and the plate end edges 63 permits the latch dog 57 to rotate clockwise, in the example illustrated in FIG. 3, but prevents rotation counter-clockwise past the upright position shown.

The front trolley upper portion 28 also includes an elongated generally vertically extending front drive dog 64 spaced forwardly of the latch dog 57 for trapping a chain pusher lug 5 therebetween. The drive dog 64 has an upper part 65 and a lower part 66. The drive dog upper part 65 normally extends above the channel upper flanges 51 and terminates normally above the lower end 61 of the chain pusher lugs 5 and into the path thereof. The drive dog lower part 66 slidably extends between the plate members 15 in a manner now described.

The drive dog 64 has an elongated transverse vertically extending slot 67 therethrough having an upper closed end 68 and a lower closed end 69. The slot 67 extends longitudinally of the drive dog 64 but is proportioned with respect thereto so that the drive dog retains considerable resistance to bending or deformation in a direction longitudinally of the trolley assembly 10. A guide shaft 70 is fixed to and extends laterally between the plate members 15 and through the drive dog slot 67. The guide shaft 70 has a bushing 70' rotatably mounted thereon which has a diameter slightly less than the horizontal width of the slot 67 permitting longitudinal sliding reciprocation of the drive dog 64 on the guide shaft 70 between the slot closed ends 68 and 69.

The front trolley 11 includes an S-shaped arm 71 having a substantially semi-circular front portion 72 and a substantially semi-circular rear portion 73. The S-shaped arm 71 includes an intermediate portion 74 pivotally mounted at 75 between the plate members 15 and located forwardly and downwardly of the front wheel axle 34 thereof. The arm front portion 72 extends upwardly and forwardly of the intermediate portion 74 and terminates in a cam following roller or cam follower 76 located forwardly of the trolley upper portion 28 and within the partial enclosure 55 formed by the channels 48 and 49. The arm rear portion 73 extends rearwardly between the plate members 15 and terminates in a bifurcation 77 pivotally connected at 78 to the drive dog lower part 66.

A weight member 79 is fixed to the S-shaped arm 71 and extends forwardly and downwardly of the arm intermediate portion 74 and resiliently urges the bifurcation 77 upwardly and said cam following roller 76 downwardly. The pivotal motion of the arm 71 is limited by the engagement of the bushing 70' against the ends 68 and 69 of the slot 67.

The rear trolley 12 includes a trailing actuating member 80 rearwardly extending therefrom and contained in said partial enclosure 55. The trailing member 80 has a forward portion 81 and a rear portion 82. A vertically extending shaft 83 is connected to and extends between the transverse bars 22 and 25 and is received in the forward portion 81 whereby lateral pivot motion is permitted between the trailing member 80 horizontally and the rear trolley 12 and limited vertical motion. The rear portion 82 includes a guide pad 84 extending downwardly between the flange guiding surfaces 56 for maintaining the trailing member 80 in a suitable rearwardly extending position with respect to the rear trolley 12 even when curves are being negotiated thereby. The trailing member rear portion 82 includes a rearwardly downwardly sloping cam surface 85 having a vertical height positioned in alignment with and corresponding to the vertical displacement of the cam following roller 76 for withdrawing the drive dog upper part 65 below the lower end 61 of the chain pusher lugs as best illustrated in FIG. 3. The trailing member 80 includes a substantially horizontal upper surface 86 for supporting the cam following roller 76 in drive dog disengaged position without the downward force component caused by the weight member 79 on the cam following roller 76 producing a trolley assembly separating force which would be experienced if the cam following roller remained on the sloping cam surface 85.

The trolley 12' next rearwardly of the front trolley includes an auxiliary drive dog 87 pivotally mounted between the plate members 16 and counterweighted to maintain a normally upright position extending above the channel upper flanges 51 but normally slightly below the lower end 61 of the chain pusher lugs 5. Referring to FIG. 1, the chain-supporting track 8 has a downwardly sloping portion 88 thereon which guides the chain trolleys 7 to a closer position with respect to the load tracks 9 and in doing so lowers the chain pusher lugs 5 to a level wherein they will engage the auxiliary drive dog 87. The sloping portion 88 is placed in the conveyor system at a location somewhat preceding a transfer tongue 89 adapted to transfer or switch the trolley assembly 10 to another track such as a side track (not shown). It is to be understood that the front trolley when transferred to the other track (not shown) moves whereby the drive dog 64 slides out of engagement with the chain pusher lugs 5 which was propelling same, thus leaving the trolley assembly 10 unpowered; however, the downwardly sloping portion 88 of the chain supporting track 8 causes the succeeding pusher lug 5 to lower to a level whereby its contacts the auxiliary drive dog 87 on the respective trolley 12 to finish driving the trolley assembly 10 onto the other track (not shown). When in upright position, the auxiliary drive dog 87 contacts a cross member 90 to transfer the horizontal force provided by the pusher lugs 5 to the trolley 12. The pivotal mounting of the auxiliary drive dog 87 permits the rear trolley 12 to pass forwardly beneath a chain pusher lug 5 even when the latter is stationary within a transfer zone.

It is sometimes desirable to withdraw the drive dog 64 to a level which will clear the lower ends 61 or path of the pusher lugs 5 when said pusher lugs are in a transfer zone, that is, at a lower level than normally. Referring to FIG. 6, a cam member 91 which may be inserted into the partial enclosure 55 by any suitable means (not shown) has a sloping cam surface 92 similar to the surface 85 on the trailing member 80 but having a greater vertical height whereby the S-shaped arm 71 is rotated through a greater angle before resting on a substantially horizontal surface 93. The increased angle of rotation causes the drive dog 64 to be withdrawn into the front trolley 11 to a point whereby the upper part 65 terminates substantially flush with the upper flanges 51; thus the pusher lugs 5 are free to pass over the front trolley 11 by rotating the latch dog 57 forwardly and then clearing the drive dog 64.

It is to be understood that by inserting a cam member such as that indicated at 91 into the partial enclosure 55, the S-shaped arm 71 is rotated and the drive dog 64 is withdrawn out of engagement with a pusher lug 5. A succeeding trolley assembly driven by a succeeding lug 5 will arrive at the location occupied by the preceding trolley assembly 10 and the front trolley 11 of the succeeding trolley assembly will contact the rear trolley 12 of the preceding trolley assembly, causing the driving lugs on the succeeding assembly to also be disengaged from its pusher lug 5. Further succeeding trolley assemblies will be disengaged in the same manner and a desired number of such trolley assemblies may thus be grouped within a particular area or section of the conveyor load track. By withdrawing the cam member 91 from the S-shaped arm associated with the first trolley assembly, the drive dog 64 thereof automatically rises by virtue of the downward rotation of the S-shaped arm caused by the weight member 79. A succeeding pusher lug 5 then engages the drive dog 64 and the first assembly is propelled away from the group, withdrawing the trailing member 80 thereof and actuating the next succeeding trolley assembly 10 to be subsequently engaged with another lug 5. Thus the grouped trolley assemblies automatically re-engage with the driving chain in the same order that they were disengaged therefrom and automatic spacing therebetween is provided as determined by spacing between the pusher lugs 5.

Since a major portion of the respective trolleys and driving and disengaging mechanism is contained within the partial enclosure 55 formed by the track-forming channels 48 and 49, the conveyor system embodying this invention requires substantially less head room for comparable load capacities than known conveyor systems. The linkage arrangement for withdrawing the driving dogs 64 is designed whereby both a lever action and a horizontal thrust are utilized in disengaging the trolley from the pusher lugs 5, thus providing a more positive disengaging action to prevent jamming. It is noted that in the event of over-travel between succeeding trolley assemblies 10, that the guide pad 84 strikes the front portion 72 of the S-shaped arm causing additional rotation thereof beyond that needed for mere disengagement from the normally positioned pusher lug 5 and adds a shock absorbing effect. It is also noted that if large closure forces are experienced between succeeding trolley assemblies that contacting trolleys are not permitted to rotate about a transverse axis to the extent that they might be disengaged from the load tracks since the load wheels are trapped between the upper and lower flanges 51 and 52 of the channels.

It is to be understood that if a conveyor system is desired for shorter loads, a single trolley may be easily adapted for embodying this invention by placing a trailing member 80 on a front trolley 11 and eliminating the load trolley 12.

It is to be further understood that while one form of this invention has been illustrated and described, it is not to be limited to the specific form or arrangement of parts herein described and shown except insofar as such limitations are included in the claims.

What we claim and desire to secure by Letters Patent is:

1. In a power and free conveyor system wherein trolleys are propelled in succeeding relation along load tracks by means of pusher lugs depending from an endless driven chain suspended from chain trolleys running along a chain-supporting track spaced above said load tracks:

(a) a trolley comprising a frame including laterally spaced vertically extending parallel plate members, transverse connecting bars extending between and spacing said plate members and secured thereto, spaced front and rear horizontal axles having opposite ends projecting laterally outwardly of said plate members, a pair of front wheels and a pair of rear wheels on said trolley and respectively mounted on said front and rear axle opposite ends, (b) a pair of elongated laterally spaced channels each having a vertically disposed web and an upper and lower flange and opening toward each other forming an elongated partial enclosure therebetween for a portion of said trolley, said lower flanges being horizontally aligned forming said load tracks for said wheels, (c) said trolley portion including an elongated generally vertically extending drive dog having an upper and a lower part, said drive dog upper part normally extending above said channel upper flanges and terminating in a path formed by said chain pusher lugs, said drive dog lower part slidably extending between said plate members, guiding means on said frame for permitting limited longitudinal reciprocation of said drive dog upper part into and out of said path, (d) said trolley including an arm having a front portion and a rear portion and an intermediate portion, said arm being pivotally mounted at said intermediate portion thereof between said plate members, said front portion terminating in a cam follower located forwardly of said trolley and in said partial enclosure formed by said channels, said rear portion extending rearwardly between said plate members and terminating in a pivotal connection connected with said drive dog lower part, (e) means associated with said arm for resiliently urging said arm in a direction for urging said drive dog upper part into said path, and (f) an actuating member in said partial enclosure and adapted to selectively engage said cam follower, said actuating member being secured to a preceding trolley on said load tracks and extending rearwardly therefrom, said actuating member having a cam surface adapted to displace said cam follower in a direction for withdrawing said drive dog upper part from said path, (g) whereby contact between said trolley and said actuating member produces a chain drive disengagement from said trolley, said actuating member being pivotally connected to said preceding trolley for lateral pivotal motion with respect thereto, (h) said actuating member including a guide pad extending downwardly between said lower flanges for guiding said actuating member with respect to said load tracks whereby said actuating member is maintained in a path traveled by said cam follower.

2. In a power and free conveyor system for elongated loads requiring spaced front and rear hangers and wherein trolley assemblies are propelled in succeeding relation along load tracks by means of pusher lugs depending from an endless driven chain suspended from chain trolleys running along a chain-supporting track spaced above said load tracks:

(a) trolley assemblies having a front trolley and a rear trolley, each of said trolleys comprising a frame, at least one axle on said frame, wheels mounted on said axle, (b) an elongated beam connecting said front trolley and rear trolley, (c) a pair of elongated laterally spaced channels each having a vertically disposed web and an upper and lower flange and opening toward each other forming an elongated partial enclosure therebetween for portions of said trolleys, said lower flanges being horizontally aligned forming said load tracks for engaging said load wheels, (d) said front trolley including an elongated generally vertically extending drive dog having an upper and a lower part, said drive dog upper part normally extending above said channel upper flanges and terminating in a path formed by said chain pusher lugs, said drive dog lower part extending into said frame, guiding means on said frame for permitting limited reciprocation of said drive dog upper part into and out of said path, (e) said front trolley including an arm having a front portion and a rear portion and pivotally mounted to said frame, said front portion terminating in a cam follower located forwardly of said front trolley and in said partial enclosure formed by said channels, said arm rear portion forming a connection with said drive dog, (f) means associated with said arm for resiliently urging said arm in a direction for urging said drive dog upper part into said path, (g) said rear trolley including an actuating trailing member rearwardly extending therefrom in said partial enclosure and having a forward portion and a rear portion, said trailing member being connected at said forward portion thereof to said rear trolley frame, said rear portion of said trailing member being adapted to selectively engage said cam follower on a succeeding trolley assembly and displace said cam follower in a direction for withdrawing said drive dog upper portion from said path, (h) whereby contact between succeeding trolley assemblies produces a chain drive disengagement from the trailing trolley assembly, said trailing member being pivotally connected at said forward portion thereof to said rear trolley frame for lateral pivotal motion with respect to said rear trolley, (i) said trailing member rear portion including a guide pad extending downwardly between said lower flanges for guiding said trailing member with respect to said load tracks whereby said trailing member rear portion is maintained in a path traveled by said cam follower.

3. In a power and free conveyor system wherein trolleys are selectively propelled in succeeding relation along curved spaced apart load tracks by means of spaced apart pusher lugs moving in a path:

(a) said trolleys each having a drive dog and structure for reciprocating said drive dog into and out of said pusher lug path, (b) said reciprocating structure including an arm terminating in a contact portion located forwardly of said respective trolleys, (c) an actuating member located rearwardly of said respective trolleys and being pivotally connected thereto for lateral pivotal motion, said actuating members being positioned to engage the contact portion of a succeeding trolley upon contact between trolleys for withdrawing the respective drive dog from said path, (d) said actuating members each including a guide pad extending between and engageable with said tracks for guiding said actuating members with respect to said tracks whereby said actuating members are maintained in the path traveled by succeeding contact portions.

References Cited by the Examiner

UNITED STATES PATENTS

| 2,987,011 | 6/1961 | Melmer | 104—172 |
| 3,044,416 | 7/1962 | Reibel et al. | 104—172 |

ARTHUR L. LA POINT, *Primary Examiner.*

J. E. BABER, *Assistant Examiner.*